(No Model.)
N. W. PRATT.
DEVICE FOR WELDING THE JOINTS OF METALLIC BOXES.
No. 368,617. Patented Aug. 23, 1887.
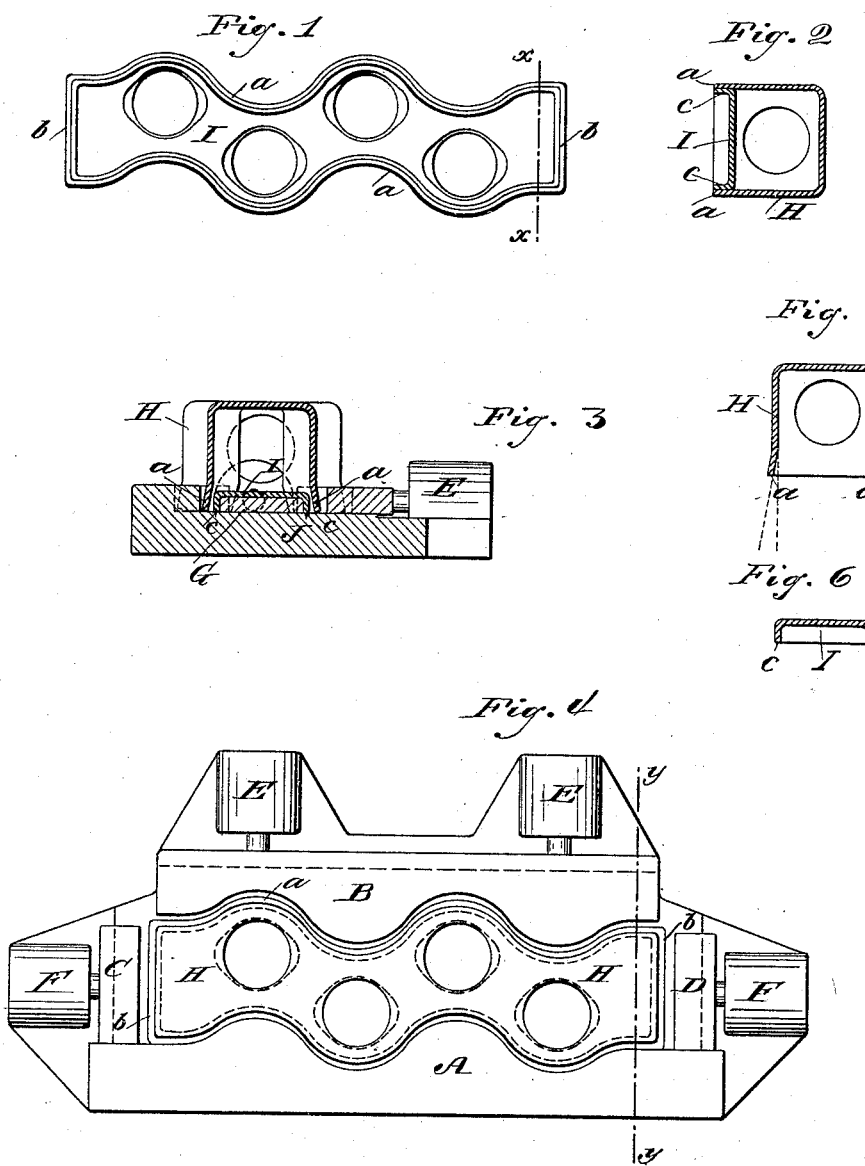

UNITED STATES PATENT OFFICE.

NAT. W. PRATT, OF BROOKLYN, NEW YORK.

DEVICE FOR WELDING THE JOINTS OF METALLIC BOXES.

SPECIFICATION forming part of Letters Patent No. 368,617, dated August 23, 1887.

Application filed May 5, 1887. Serial No. 237,192. (No model.)

*To all whom it may concern:*

Be it known that I, NAT. W. PRATT, a citizen of the United States, residing at Brooklyn, in the county of Kings and State of New York, have invented certain new and useful Improvements in the Manufacture of Wrought-Metal Boxes, of which the following is a specification.

This invention relates to an improved method of welding the margins of a flanged sheet or flat plate to the inner edges of a box-aperture in the process of forming a closed box.

The object sought is to bring the heated welding surfaces of the sheet-margins and the box-aperture opposite one another to their proper adjustment before permitting contact of the metal.

To this end the invention consists, first, in preparing the material by flaring out the edges of the box-aperture so as to allow of the margins of the sheet being placed in the correct position without the two surfaces coming in contact and making a premature weld; and, second, in applying pressure by any suitable means so as to force the pieces in contact.

In order to enable others skilled in the art to which my invention appertains to understand and use the same, I will proceed to describe the construction and operation of one form of machine by which the method may be carried into practice.

The accompanying drawings illustrate a machine of special adaptation to welding flanged hand-hole sheets into corrugated headers designed for use in sectional water-tube steam-boilers.

Figure 1 is a plan view of a completed header having the hand-hole sheet welded in place; Fig. 2, a cross-section of the same on the line $x\, x$, looking toward the end nearest to said line; Fig. 3, a cross-section of the machine, having the box and the flanged sheet placed in position between the dies preparatory to welding, the plane of said section being that of the line $y\, y$, Fig. 4; Fig. 4, a plan view of the machine corresponding in the position of the several parts to Fig. 3; and Figs. 5 and 6, cross-sectional views of detached parts of the box prepared for welding.

The flared shape given to the aperture of the box, as shown in Figs. 3 and 5, is imparted when the box is stamped out, and is made sufficient to admit the sheet I, so that the outer edges of the box and sheet-flanges coincide while the two surfaces are yet out of contact. In the absence of the flared shape given to the box-aperture the heated surfaces must necessarily be passed while in welding contact the full depth of the sheet-flange, which is found to produce a premature weld before the pieces have reached their proper adjustment. By the present means the first contact occurs when the dies A B C D close upon the work.

The several dies A B C D have their acting faces made perpendicular to the surface of the bed-plate J and of a height extending above the same sufficient to cover the bent or expanded portion of the box-aperture.

In the present machine, the die A is shown as a stationary die, fixed to or integral with the bed-plate, acting as an abutment for the movable die B; but the die A may also be movable. The several movable dies B, C, and D are actuated by means of the hydraulic cylinders E E F F, secured upon the sides of the bed-plate J, or they may be actuated by other suitable appliances.

The serpentine working-faces of the dies A and B have a contour corresponding to the finished exterior of the box-rim $a$, Fig. 1.

For the purpose of supporting the margins of the flanged sheet I, a mandrel, G, Fig. 3, is secured to the bed-plate, and has its edges made of a serpentine form longitudinally corresponding to the form of the dies A B, and made of a size to fit between the backs of the flanges $c$.

In the instance of heading with flat plate, the latter is sustained in position for welding by placing or clamping it by any suitable means upon the plane surface of the bed-plate J, the mandrel G being dispensed with.

In the operation of the machine, the heated sheet I is pressed over the mandrel G. The box, heated at its flanges, is placed over the sheet, surrounding the margins of the same so as to rest with its edges $a$ upon the plane surface of the bed-plate, and pressure applied to the die-plungers in the several cylinders E F.

The several dies may be advanced simultaneously; but the dies A and B are preferably closed first, so as to compress the irregular sides of the box-flange, and the dies C D subsequently closed, so as to finish the ends and take up the surplus of metal at those points after the box is gripped between the first set of dies. The dies being withdrawn, the work has the form shown in cross-section in Fig. 2, the sides of the box being finished perfectly straight. The method also applies to welding flanged sheets or flat plates into both open sides of a box-rim or strap formed into the desired contour of the box and having its edges flared on either side for the reception of the sheets.

It is to be understood that I do not confine myself to the particular devices for practicing the method taken for illustration herewith, nor to the particular application described, as the invention is applicable to welding wrought-metal boxes without restriction to form or use of the same.

I claim as my invention—

The method herein described of welding wrought-metal boxes, consisting of first enlarging the aperture of an open box by flaring the edges of the same outwardly; second, introducing a sheet having dimensions to fit the normal size of said aperture, and, third, contracting the box edges against the sheet-margins so as to weld the same together at their point of first contact, for the purposes set forth.

NAT. W. PRATT.

Witnesses:
CHAS. W. FORBES,
AUG. CREVELING.